United States Patent
Lin et al.

(10) Patent No.: US 10,774,222 B2
(45) Date of Patent: Sep. 15, 2020

(54) PHOTOCURABLE COATING COMPOSITION AND APPLICATION THEREOF

(71) Applicant: ETERNAL MATERIALS CO., LTD., Kaohsiung (TW)

(72) Inventors: Chiao-Yang Lin, Kaohsiung (TW); Te-Sheng Yen, Kaohsiung (TW); Hung-Yu Wang, Kaohsiung (TW); Kun-Fu Yang, Kaohsiung (TW)

(73) Assignee: ETERNAL MATERIALS CO., LTD., Kaohsiung (TW)

( * ) Notice: Subject to any disclaimer, the term of this patent is extended or adjusted under 35 U.S.C. 154(b) by 0 days.

(21) Appl. No.: 16/455,906

(22) Filed: Jun. 28, 2019

(65) Prior Publication Data
US 2020/0002545 A1    Jan. 2, 2020

(30) Foreign Application Priority Data
Jun. 28, 2018  (TW) .............. 107122418 A

(51) Int. Cl.
| | |
|---|---|
| *C09D 4/06* | (2006.01) |
| *C08K 5/07* | (2006.01) |
| *C08K 5/5397* | (2006.01) |
| *G02B 6/138* | (2006.01) |
| *C08F 20/18* | (2006.01) |
| *C08F 2/48* | (2006.01) |
| *G02B 6/122* | (2006.01) |
| *G02B 6/12* | (2006.01) |

(52) U.S. Cl.
CPC ................ *C09D 4/06* (2013.01); *C08F 2/48* (2013.01); *C08F 20/18* (2013.01); *C08K 5/07* (2013.01); *C08K 5/5397* (2013.01); *G02B 6/1221* (2013.01); *G02B 6/138* (2013.01); *C08L 2205/025* (2013.01); *G02B 2006/1219* (2013.01)

(58) Field of Classification Search
CPC ................. G02B 6/1221; G02B 6/138; G02B 2006/1219; C09D 4/06; C08F 2/48; C08F 20/18; C08K 5/07; C08K 5/5397; C08L 2205/025

USPC ........................................... 385/130
See application file for complete search history.

(56) References Cited

U.S. PATENT DOCUMENTS

| | | | | |
|---|---|---|---|---|
| 6,211,260 | B1 * | 4/2001 | Nakamura ............... | C09D 4/00 522/100 |
| 2004/0242720 | A1 | 12/2004 | Chisholm et al. | |
| 2014/0370214 | A1 * | 12/2014 | Araki ................. | B41M 5/0023 428/35.7 |
| 2016/0145449 | A1 * | 5/2016 | Hilgers .................... | C09D 4/06 428/327 |
| 2019/0338142 | A1 * | 11/2019 | Hartmann-Thompson ................. | C08K 9/06 |

FOREIGN PATENT DOCUMENTS

| | | |
|---|---|---|
| CN | 1795217 A | 6/2006 |
| CN | 104877525 A | 9/2015 |
| CN | 106497498 A | 3/2017 |
| WO | 2012071969 A1 | 6/2012 |

OTHER PUBLICATIONS

Chinese Office Action corresponding to counterpart application 201810810879.4 dated May 20, 2020.
CN 1795217A English Abstract.

* cited by examiner

*Primary Examiner* — Jerry M Blevins
(74) *Attorney, Agent, or Firm* — Ladas & Parry LLP

(57) ABSTRACT

The present disclosure provides a photocurable coating composition, including: (a) a (meth)acrylate monomer or oligomer with at least four functional groups; (b) a difunctional (meth)acrylate monomer, (c) a monofunctional (meth) acrylate monomer, and (d) an initiator. The difunctional (meth)acrylate monomer is present in an amount of 30 to 70 wt % based on the total weight of the photocurable coating composition. The present disclosure also provides an optical film having a microstructure layer made from the photocurable coating composition. The optical film can be as a light guide film in a back light module of a display.

21 Claims, No Drawings

PHOTOCURABLE COATING COMPOSITION AND APPLICATION THEREOF

BACKGROUND OF THE INVENTION

1. Field of the Invention

The present disclosure provides a photocurable coating composition and an optical film having a microstructure layer formed by the photocurable coating composition. The optical film can be used as a light guide film in a back light module (BLU) of a display.

2. Description of the Related Art

In general, the main structure of a liquid crystal display (LCD) includes two parts, i.e., a panel and a back light module. The panel itself does not emit light, so the back light module as a light source is an important component of the LCD, which is very important for improving the brightness and uniformity of the display and the image quality.

The light guide plate can transmit light generated by the light source to a predetermined location by using the principle of total reflection, and is commonly used in a back light module to guide the light from the light source to the panel. Generally, the light guide plate is designed with a microstructure to destroy the total reflection of light, so that the light can be emitted from the front side of the light guide plate.

Conventional light guide plates can be produced by injection molding techniques. For example, a corresponding microstructure can be designed in a mold, into which molten resin is injected under high pressure to obtain a light guide plate. Alternatively, a surface-smooth base plate and a microstructure layer can be separately made by injection molding, and then the two can be laminated by hot pressing to obtain a light guide plate.

Most of the light guide plates known in the art are made by polymethyl methacrylate (PMMA). Polymethyl methacrylate has the advantages of good light transmittance, easy processing and the like, and is one of the main raw materials for light guide plates. However, since polymethyl methacrylate has high water absorption, its dimensional stability is easily affected. Further, it is brittle in nature, and easily broken in a relatively thin light guide plate, so it is difficult to make thin or to manufacture it by a roll-to-roll continuous production technique. Other types of optical films may be thin, such as light-concentrating film, diffusion film, etc. They are generally made using polyethylene terephthalate (PET), and have a thickness between about 0.05 mm and 0.25 mm. Most of these films are directly attached to other optical components, so the requirements for mechanical properties (such as strength) are less stringent.

Another light guide plate material is polycarbonate (PC). Polycarbonate has good toughness and better impact strength than polymethyl methacrylate, but its light transmittance is not as good as polymethyl methacrylate. In addition, compared with polymethyl methacrylate, the hardness of polycarbonate is poor, and the microstructure is easily damaged in manufacturing a light guide plate, resulting in decreased yield.

In recent years, back light module factories have gradually adapted to use of thin and flexible light guide film. For example, the conventional injection-molded light guide film can be replaced with a light guide film made by imprinting a microstructure on a UV coating of a PC thin film. The light guide film is obtained using a roll-to-roll continuous production technique, which increases production speed. However, at present, the light guide film on the market generally has the disadvantages of poor adhesion between glue and substrate, chromatic aberrations resulting from large differences in refractive index between glue and substrate, and the like.

SUMMARY OF THE INVENTION

The present disclosure provides a photocurable coating composition which does not have the above disadvantages, is easy to operate and has a high refractive index. The photocurable coating composition of the present disclosure can be coated on a PC substrate to prepare an optical film (especially a light guide film) having a microstructure. The cured coating layer has good adhesion to the PC substrate, good hardness, and flexibility, can greatly reduce the thickness of the light guide film, and can reduce the chromatic aberration between incoming light and outgoing light, so that the problems of the prior art can be effectively solved.

In one aspect, the present disclosure provides a photocurable coating composition, including:
(a) a (meth)acrylate monomer or oligomer with at least four functional groups;
(b) a difunctional (meth)acrylate monomer;
(c) a monofunctional (meth)acrylate monomer; and
(d) an initiator,
wherein the difunctional (meth)acrylate monomer is present in an amount of 30 to 70 wt % based on the total weight of the photocurable coating composition.

In another aspect, the present disclosure provides an optical film, including a substrate and a microstructure layer on at least one surface of the substrate, the microstructure layer being formed by curing the aforementioned photocurable coating composition.

The photocurable coating composition of the present disclosure has the advantages of rapid curing and low viscosity, and the obtained optical film has the characteristics of high hardness, good adhesion to PC and high refractive index, and can reduce the chromatic aberration between incoming light and outgoing light.

DETAILED DESCRIPTION

After referring to the detailed description described later, the basic spirit of the present disclosure as well as the technical means and preferred to embodiments of the present disclosure can be readily understood by a person of ordinary skill in the an.

Each aspect and each example of the present disclosure disclosed in this specification can be individually combined with other aspect(s) and example(s) of the present disclosure, including all possible combinations.

The words used herein are for the purpose of describing the embodiments, and are not intended to limit the protection scope of the present disclosure. For example, the word "a (an)" used in the specification covers the singular and plural forms, unless the context clearly dictates otherwise.

In particular, the present disclosure provides a polymerizable composition, including the following components:
(a) a (meth)acrylate monomer or oligomer with at least four functional groups;
(b) a difunctional (meth)acrylate monomer;
(c) a monofunctional (meth)acrylate monomer; and
(d) an initiator.

(Meth)Acrylate Monomer or Oligomer with at Least Four Functional Groups

The (meth)acrylate monomer or oligomer with at least four functional groups used in the present disclosure may have four, five, six or more functional groups.

Examples of the (meth)acrylate monomer with at least four functional groups suitable for the present disclosure are, for example but not limited to, pentaerythritol tetraacrylate, ethoxylated pentaerythritol tetraacrylate, bis-trimethylolpropane tetraacrylate, propoxylated pentaerythritol tetraacrylate, dipentaerythritol hexaacrylate or caprolactone modified dipentaerythritol hexaacrylate.

Examples of the (meth)acrylate oligomer with at least four functional groups suitable for the present disclosure are, for example but not limited to, hyperbranched polyurethane (meth)acrylate or hyperbranched polyester (meth)acrylate. According to an embodiment of the present disclosure, the (meth)acrylate oligomer with at least four functional groups has not more than twenty functional groups, preferably six to twenty functional groups, and has a number average molecular weight between 2000 and 5000, preferably between 2500 and 4500.

Commercially available hyperbranched polyurethane (meth)acrylates suitable for the present disclosure include, but are not limited to, those produced by Eternal Materials Co., Ltd. under the product names of 6196-100, 6195-100, 6197, and 6185.

Commercially available hyperbranched polyester (meth)acrylates suitable for use in the present disclosure include, but are not limited to, those produced by Eternal Materials Co., Ltd. under the product names of 6311-100, 6312-100, 6313-100, 6315, 6316, and 6319.

Adding an appropriate amount of the aforementioned (meth)acrylate monomer or oligomer with at least four functional groups to the composition can enhance the cross-linking density and increase the reaction rate, and can increase the hardness and/or glass transition temperature of the cured coating layer.

According to an embodiment of the present disclosure, the content of the (meth)acrylate monomer or oligomer with at least four functional groups is 5 to 25 wt %, for example, 5 wt %, 6 wt %, 8 wt %, 10 wt %, 15 wt %, 20 wt %, or 25 wt %, based on the total weight of the photocurable coating composition. If the content of the (meth)acrylate monomer or oligomer with at least four functional groups is less than 5 wt %, the curing speed of the photocurable coating composition is too low, so the risk of yellowing of the coating layer due to ultraviolet light (UV) irradiation; if the content exceeds 25 wt %, the curing speed of the photocurable coating composition is too high, and the shrinkage of the coating layer is large, which is disadvantageous for adhesion to the substrate.

Bifunctional (Meth)Acrylate Monomer

For a light guide film, generally, the greater the refractive index of the coating layer is, the better the light guide effect is. Although the use of a monofunctional (meth)acrylate monomer having a high refractive index increases the refractive index of glue, and thereby increases the refractive index of the coating layer, the use of a monofunctional (meth)acrylate monomer having a high refractive index tends to make the coating layer hard but brittle and poorly adhered to PC. In addition, monomers having a high refractive index are mostly easy to yellow, causing chromatic aberration. Another cause of chromatic aberration is the scattering phenomenon. The inventors of the present disclosure have found, through extensive research, that adding a specific ratio (i.e., 30 to 70 wt %) of a bifunctional (meth)acrylate monomer having the following formula (1), (2) or a mixture thereof into the composition can enhance the refractive index of the photocurable coating composition before curing, and the obtained coating layer has an increased hardness, is not easy to yellow, cannot easily generate scattering, and can effectively reduce chromatic aberration:

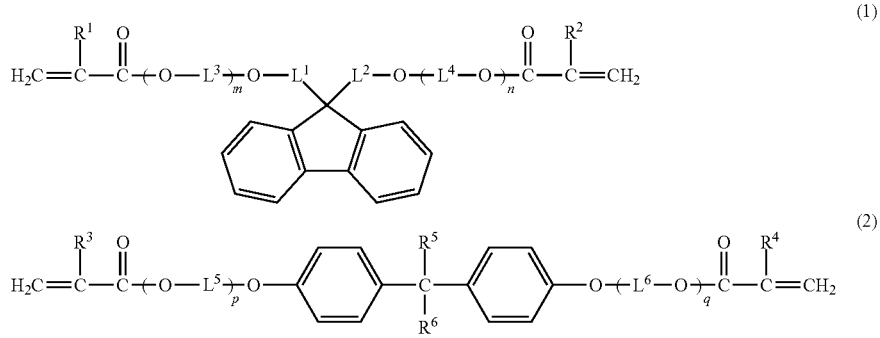

wherein
$R^1$, $R^2$, $R^3$, $R^4$, $R^5$ and $R^6$ are each independently H or methyl;
$L^1$ and $L^2$ are each independently phenylene;
$L^3$, $L^4$, $L^5$ and L are each independently $C_{1-6}$ alkylene, preferably $C_{1-4}$ alkylene, and more preferably methylene or ethylene;
m, n, p, and q are each independently 0 or an integer greater than 0, preferably an integer from 0 to 30;
m+n is an integer from 2 to 30, preferably an integer from 2 to 10; and
p+q is an integer from 2 to 30, preferably an integer from 2 to 10.

According to an embodiment of the present disclosure, m, n, p and q are each independently an integer from 0 to 30, for example 0, 1, 2, 5, 10, 15, 20, 25 or 30.

According to an embodiment of the present disclosure, m+n is an integer from 2 to 30, for example 2, 5, 10, 15, 20, 25 or 30.

According to an embodiment of the present disclosure, p+q is an integer from 2 to 30, for example 2, 5, 10, 15, 20, 25 or 30.

According to an embodiment of the present disclosure, the content of the difunctional (meth)acrylate monomer is 30 to 70 wt %, for example, 30 wt %, 35 wt %, 40 wt %, 45 wt %, 50 wt %, 55 wt %, 60 wt %, 65 wt % or 70 wt %, preferably 40 to 70 wt %, and more preferably 50 to 70 wt %, based on the total weight of the photocurable coating composition. If the content of the above bifunctional (meth)acrylate monomer is less than 30 wt %, the photocurable coating composition hardly has a high refractive index, and if the content exceeds 70 wt %, the obtained photocurable coating composition is too hard and brittle, and is poorly adhered to PC.

According to an embodiment of the present disclosure, the difunctional (meth)acrylate monomer includes:

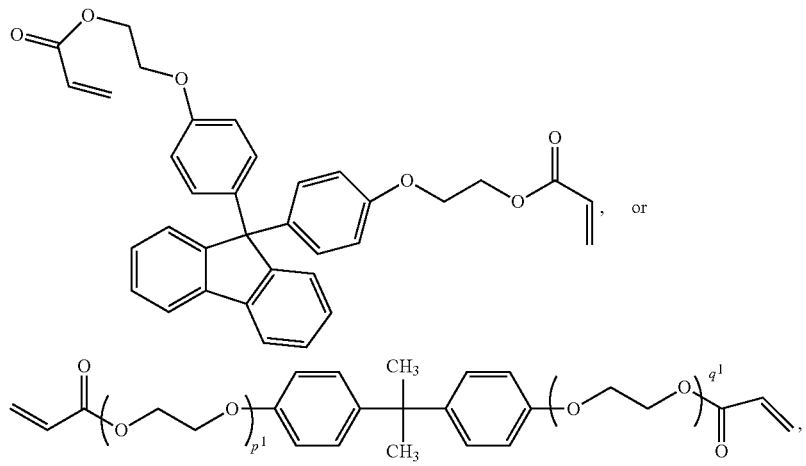

wherein $p^1$ and $q^1$ have the same definitions as those of p and q, and $p^1+q^1$ has the same definition as that of p+q.

Monofunctional (Meth)Acrylate Monomer

The monofunctional (meth)acrylate monomer used in the present disclosure may be, for example but not limited to, methyl methacrylate (MMA), butyl methacrylate, 2-phenoxy ethyl acrylate, ethoxylated 2-phenoxy ethyl acrylate, 2-(2-ethoxyethoxy)ethyl acrylate, cyclic trimethylolpropane formal acrylate, β-carboxyethyl acrylate, lauryl methacrylate, isooctyl acrylate, stearyl methacrylate, isodecyl acrylate, isoborny methacrylate, benzyl acrylate, 2-hydroxyethyl methacrylate phosphate, hydroxyethyl acrylate (HEA), 2-hydroxyethyl methacrylate (HEMA), 2-phenoxy ethyl acrylate (PHEA), cumyl phenoxyl ethyl acrylate (CPEA), tetrahydrofurfuryl acrylate, biphenylmethyl acrylate, phenoxylbenzyl acrylate or phenyl phenoxy ethyl acrylate.

The monofunctional (meth)acrylate monomer used in the present disclosure can be used as a diluting monomer to adjust the viscosity of the photocurable coating composition.

According to an embodiment of the present disclosure, the content of the monofunctional (meth)acrylate monomer is 15 to 40 wt %, for example, 15 wt %, 17 wt %, 19 wt %, 20 wt %, 25 wt %, 30 wt %, 35 wt %, 38 wt % or 40 wt %, preferably 15 to 35 wt %, and more preferably 20 to 35 wt %, based on the total weight of the photocurable coating composition. If the content of the monofunctional (meth) acrylate monomer is less than 15 wt %, the viscosity of the photocurable coating composition is high, which is disadvantageous for thin coating, and the adhesion to the substrate is not good, and if the content exceeds 40 wt %, the refractive index deteriorates, and the cured optical film has low hardness (low Shore hardness).

According to an embodiment of the present disclosure, the adhesion of the coating layer to the polycarbonate substrate can be further enhanced when a monofunctional (meth)acrylate monomer containing a phenyl group or a cyclic ether group is selected.

According to another embodiment of the present disclosure, the monofunctional (meth)acrylate monomer containing a phenyl group or a cyclic ether group has the following formula (3):

$$CH_2=C(R^{11})-C(=O)-O-L^7-Q \qquad (3)$$

wherein
$R^{11}$ is H or methyl,
$L^7$ is $C_{1-6}$ alkylene or $C_{1-6}$ alkoxylene, preferably $C_{1-4}$ alkylene or $C_{1-4}$ alkoxylene, and more preferably methylene, ethylene, methoxylene or ethoxylene; and
Q is a phenyl group or a cyclic ether group which may be unsubstituted or substituted with a phenyl group, a phenoxy group or a $C_{1-6}$ alkylphenyl group.

Examples of the cyclic ether group are, for example but not limited to, an oxiranyl group, a tetrahydrofuranyl group and a dioxoalkyl group.

According to still another embodiment of the present disclosure, the monofunctional (meth)acrylate monomer is selected from the group consisting of:

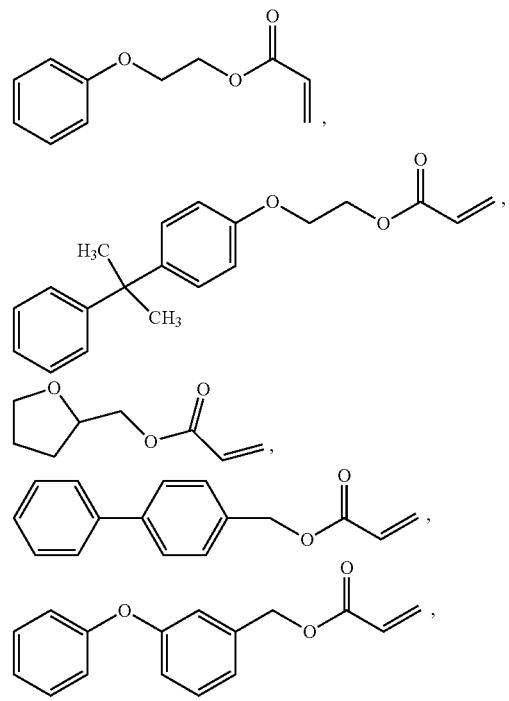

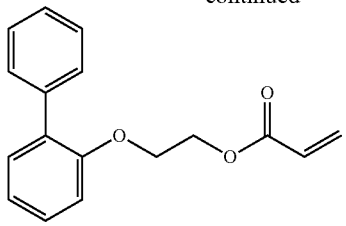

and a combination thereof.

Initiator

The initiator used in the present disclosure is a photoinitiator, which generates a free radical upon light irradiation and initiates a polymerization reaction by the transfer of the free radical. The photoinitiator suitable for the present disclosure is not particularly limited, and a preferred photoinitiator is a hydroxyketone type photoinitiator or an acylphosphine oxide type photoinitiator or a mixture thereof.

Examples of the hydroxyketone type photoinitiator are, for example but not limited to, 2-hydroxy-2-methyl-1-phenyl-propan-1-one, 1-hydroxy cyclohexyl phenyl ketone, 1-[4-(2-hydroxyethoxy)-phenyl]-2-hydroxy-2-methyl-1-propan-1-one, or 2-hydroxy-1-{4-[4-(2-hydroxy-2-methyl-propionyl)-benzyl]-phenyl}-2-methyl-propan-1-one).

Examples of the acylphosphine oxide type photoinitiator are, for example but not limited to, 2,4,6-trimethylbenzoyl diphenyl phosphine oxide or bis(2,4,6-trimethylbenzoyl)-phenylphosphine oxide.

Commercially available photoinitiators which can be used in the present disclosure include: Irgacure®2959, Irgacure®127, Darocur®1173, Irgacure®500, Irgacure®184, Irgacure®TPO, Irgacure®TPO-L, Irgacure®2100, Irgacure®819, Irgacure®819DW, Darocur®4265 and Irgacure®2022 supplied by BASF Corporation; Runtecure®1103 supplied by Changzhou RUNTEC.

Theoretically, the amount of the photoinitiator of the present disclosure is not particularly limited, and can be adjusted as needed depending on the type and amount of the polymerizable monomer/oligomer contained in the photocurable coating composition by routine experimentation. However, in an embodiment of the present disclosure, the inventors of the present disclosure found that when the amount of the initiator was excessive, the curing speed may be too fast, resulting in poor adhesion of the coating layer to the substrate. According to an embodiment of the present disclosure, the content of the initiator is between 1 wt % and 6 wt %, for example, 1 wt %, 2 wt %, 3 wt %, 4 wt %, 5 wt % or 6 wt %, based on the total weight of the photocurable coating composition.

Solvents and Additives

The photocurable coating composition of the present disclosure may optionally include other additives known to a person of ordinary skill in the art, for example (but are not limited to): leveling agents, stabilizers, diluents, inorganic fillers, antistatic agents, slip agents, colorants, surfactants, curing agents, fluorescent whitening agents, co-initiators and the like. The content of the additives may be adjusted a person of ordinary skill in the art via routine experimentation for.

The photocurable coating composition of the present disclosure can maintain good leveling property and coating property without the presence of a solvent, and the environmental problem of solvent evaporation can be prevented when the composition does not contain a solvent.

According to a preferred embodiment of the present disclosure, the photocurable coating composition of the present disclosure is free of solvents and additives.

Photocurable Coating Composition

The photocurable coating composition of the present disclosure includes:

(a) a (meth)acrylate monomer or oligomer with at least four functional groups;

(b) a difunctional (meth)acrylate monomer;

(c) a monofunctional (meth)acrylate monomer; and (d) an initiator, wherein the difunctional (meth)acrylate monomer is present in an amount of 30 to 70 wt % based on the total weight of the photocurable coating composition.

In the present disclosure, the total weight of the photocurable coating composition means the total solid weight (i.e., solid content) of the photocurable coating composition.

According to a preferred embodiment of the present disclosure, the photocurable coating composition of the present disclosure includes the aforementioned components (a) to (d), and the photocurable coating composition has a solid content of 100 wt %, that is, no solvent.

To facilitate thin coating, the viscosity of the photocurable coating composition should not be too high. According to an embodiment of the present disclosure, the photocurable coating composition has a viscosity of 100 to 2000 cps at 25° C., for example, 100 cps, 200 cps, 300 cps, 400 cps, 500 cps, 600 cps, 700 cps, 800 cps, 900 cps, 1000 or 2000 cps, preferably 100 to 1500 cps, and more preferably 100 to 1000 cps.

The inventors of the present disclosure have found that the type and amount of the components contained in the photocurable coating composition affect the properties of the coating composition and the cured coating layer. Although the components may each have different effects, they interact when they coexist in the composition, and therefore, it is not easy to develop a composition that combines all of the desired properties. After extensive research, the inventors of the present disclosure have proposed the aforementioned photocurable coating composition. The photocurable coating composition has the advantages of rapid curing and low viscosity, and can be used to produce an optical film in a roll-to-roll continuous manner by a roller process which is fast and convenient and can reduce the risk of yellowing. The cured coating layer has high hardness and moderate toughness, which ameliorates not only the disadvantage of microstructure damage due to the softness of the conventional polycarbonate, but also the disadvantage that the conventional polymethyl methacrylate is too brittle. In addition, the coating layer has a high refractive index (similar to the refractive index of the polycarbonate substrate) and low yellowing, and has good adhesion to the polycarbonate substrate.

Application of Photocurable Coating Composition

Based on the foregoing characteristics, the photocurable coating composition of the present disclosure can be applied to at least one surface of a substrate or an optical thin sheet to form a coating layer having a microstructure. Further, since the photocurable coating composition of the present disclosure contains a bifunctional (meth)acrylate monomer having a high refractive index, the formed coating layer can have a high refractive index.

The photocurable coating composition of the present disclosure can be used to prepare various optical films having a microstructure, such as a light guide film. The obtained optical film has excellent optical properties, firm microstructure and high hardness, and is not easily damaged.

The present disclosure further provides an optical film, including a substrate and a microstructure coating layer on at least one surface (bottom surface) of the substrate. The microstructure coating layer is formed by curing the aforementioned photocurable coating composition. The microstructure coating layer of the present disclosure has a thickness between 1 µm and 20 µm, for example 1 µm, 2 µm, 4 µm, 6 µm, 8 µm, 10 µm, 12 µm, 14 nm, 16 µm, 18 µm or 20 µm, preferably between 2 µm and 10 µm.

The photocurable coating composition of the present disclosure has a refractive index of at least 1.54 before curing, and between 1.57 and 1.63 after curing which is similar to the refractive index of the polycarbonate substrate. The photocurable coating composition of the present disclosure has a relatively high refractive index, contributes to the convergence of light, and can increase the luminance.

According to an embodiment of the present disclosure, the optical film of the present disclosure can be used as a light guide film in a back light module of a display.

According to an embodiment of the present disclosure, the optical film of the present disclosure has a chromatic aberration less than 0.012 between incoming light and outgoing light, for example, less than 0.01 or less than 0.007 (measured by an integrating sphere lumen measuring system, model SLM-40T, AMA Optoelectronics Inc (spherical diameter 100 cm)). Further, the optical film of the present disclosure has a b value less than 1, preferably less than 0.9, and more preferably less than 0.8, according to a Lab color system.

According to an embodiment of the present disclosure, the microstructure is a structure of dots ("dot structure"). The dot structure of the optical film of the present disclosure is well known to a person of ordinary skill in the art. Preferably, the dot structure is located on a surface of the optical film opposite to the light emitting surface. In the example of the light guide film, the light emitting surface is also referred to as the front surface of the light guide film, and the surface opposite to the light emitting surface is referred to as the back surface or the bottom surface of the light guide film. The principle of the light guide film is to transmit the light of the light source to the distal end of the light guide film by using the principle of total reflection. When a pattern of dots is formed on the bottom surface of the light guide film, the pattern design with different densities and different sizes of dots can be used to destroy the total reflection of the light and guide the light to the front surface of the light guide film.

Optionally, the photocurable coating composition of the present disclosure can be used to form another microstructure (diffusion structure) coating layer on the surface of the substrate opposite to the microstructure coating to layer of the present disclosure to achieve light uniformity and reduce chromatic aberration. The shape of the diffusion structure may be, for example, but is not limited to, arc columnar structure, lenticular structure, conical structure, microlens, or any combination thereof. The diffusion structure coating layer of the present disclosure has a thickness between 1 µm and 20 µm, for example, 1 µm, 2 µm, 4 µm, 6 µm, 8 µm, 10 µm, 12 µm, 14 µm, 16 µm, 18 µm or 20 µm, preferably between 2 µm and 10 µm. As previously described, the photocurable coating composition of the present disclosure has a refractive index of at least 1.54 before curing and 1.57 to 1.63 after curing, and can effectively enhance the luminance of the optical film.

The substrate used in the present disclosure may be any one well known to a person of ordinary skill in the art, for example, selected from the following group: polyester resin such as polyethylene terephthalate (PET) or polyethylene naphthalate (PEN), polyacrylate resin such as polymethyl methacrylate (PMMA), polyolefin resin such as polyethylene (PE) or polypropylene (PP), polycycloolefin resin, polyimide resin, polycarbonate resin, polyurethane resin, cellulose triacetate (TAC), polylactic acid, and a combination thereof, but is not limited thereto. Polycarbonate resin is preferred. The thickness of the substrate generally depends on the requirements of the optical product to be made and is typically in the range of 50 µm to 300 µm.

The thickness of the conventional light guide plate is generally between 250 µm and 350 µm. The overall thickness of the optical film of the present disclosure is relatively small, for example, between 150 µm and 250 µm, which is thinner than that in the prior art, and the microstructure thereof is not easily broken. In addition, the optical film of the present disclosure has the advantages of good hardness, better resistance to breakage, reduced thickness, less chromatic aberration and the like as compared to the conventional PMMA light guide plate having an optical structure layer formed by an injection molding process or a coextrusion and hot embossing process.

According to an embodiment of the present disclosure, the optical film of the present disclosure can be used as a light guide film in a back light module of a display, including a substrate and a microstructure coating layer on at least one surface of the substrate. The microstructure coating layer is formed by curing the aforementioned photocurable coating composition, and the microstructure coating layer includes a microstructure of a plurality of dots.

The optical film of the present disclosure can be produced in any manner known to a person of ordinary skill in the art. For example, it can be produced by a method including the steps: applying the photocurable coating composition according to the present disclosure to a substrate to form a coating layer, forming a microstructure of dots on the coating layer by roller embossing, and curing the microstructure coating layer by light irradiation during roller embossing.

In detail, the preparation method of the optical film of the present disclosure may include the following steps:

(I) mixing a (meth)acrylate monomer or oligomer with at least four functional groups, a difunctional (meth)acrylate monomer, a monofunctional (meth)acrylate monomer, and an initiator in an appropriate ratio to form the coating composition of the present disclosure;

(II) applying the coating composition to a substrate to form a coating layer;

(III) performing embossing or thermal transfer using a roller having a specific structure thereon to form a structured surface on the coating layer, and simultaneously irradiating the coating layer with energy rays to cure the coating layer, and (IV) optionally applying a protective film to the cured coating layer.

The energy rays of the above step (III) refer to a light source of a certain range of wavelengths, for example, ultraviolet light, infrared light, visible light or heat rays (radioactive or radiation), etc., preferably ultraviolet light. The irradiation intensity may be 100 to 1000 $mJ/cm^2$, preferably 200 to 800 $mJ/cm^2$, and more preferably 200 to 400 $mJ/cm^2$.

The protective film of the above step (IV) is, for example but not limited to, polyester resin, such as polyethylene terephthalate (PET) or polyethylene naphthalate (PEN); polymethacrylate resin, such as polymethyl methacrylate (PMMA); polyimide resin; polystyrene resin; polycycloolefin resin; polyolefin resin; polycarbonate resin; polyurethane resin; triacetate cellulose (TAC); or a mixture thereof. Polyethylene terephthalate, polymethyl methacrylate, polycycloolefin resin, triacetate cellulose or a mixture thereof is preferable, and polyethylene terephthalate is more preferable.

If necessary, the above step(s) can be repeated to obtain a plurality of the coating layers. In addition, the other side of the optical substrate (i.e., the surface opposite to the above structured surface) may be further coated with a single or a plurality of coating layers as desired. The shape, hardness and refractive index of the microstructure of the two coating layers may be the same or different.

The following examples are intended to illustrate the embodiments of the present disclosure and to illustrate the technical features of the present disclosure, and are not intended to limit the protection scope of the present disclosure. Any changes or equivalents that can be easily made by those skilled in the an are within the scope of the present disclosure. The protection scope of the present disclosure should be determined by the scope of the appended claims.

Examples 1 to 7 and Comparative Examples 8 to 16

First, the following components were mixed in parts by weight shown in Table 1 to obtain the photocurable coating compositions of the examples and comparative examples. The solids content was about 100%.

Component (a): dipentaerythritol hexaacrylate (monomer with at least four functional groups)

Component (b): bisphenol A epoxy diacrylate (bifunctional monomer)

Component (b1): tricyclodecane dimethanol dimethacrylate

Component (c): mixture of 2-phenoxy ethyl acrylate and hydroxyethyl acrylate in a ratio of 1:1 (monofunctional monomer)

Component (d): 1-hydroxycyclohexyl phenyl ketone (initiator)

Component (e): ethoxylated trimethylolpropane trimethacrylate (trifunctional monomer)

Component (f): pentaerythritol tetraacrylate (tetrafunctional monomer)

Subsequently, an optical film was prepared using the photocurable coating composition of each of the examples and comparative examples by the following procedures: the photocurable coating composition was applied to the surface of a polycarbonate film (Teijin L-1225 (L)), and pressed by a roller having a lenticular structure, and at the same time, cured by a UV exposure machine (Fusion UV, F600V, 600 W/inch, H-type light source), power set to 65-95%, speed 10-30 m/min, energy ray 250 mJ/cm$^2$, and demolded after curing to obtain an optical film having a structured coating layer thereon. The thickness of the coating layer is 3 to 5 μm.

<Test Method>

The characteristics were evaluated by the following methods and recorded in Table 1.

Curing speed: The photocurable coating composition of each of the examples and comparative examples was coated on the surface of a polycarbonate film (Teijin Company L-1225 (L)), and after irradiation with an energy ray of 60 mJ/cm$^2$ and a speed of 30 m/min using the above-described UV exposure machine, the stickiness of the surface of the coating layer was tested:

◎: The surface is tested by finger touch. The surface is not sticky and the coating layer feels much harder, indicating a more complete reaction.

○: The surface is tested by finger touch. The surface is not sticky and the coating layer feels hard, indicating a complete reaction.

Δ: The surface is tested by finger touch. Although the surface is not sticky, the coating layer feels soft, indicating that the interior of the coating layer is not completely cured.

Viscosity: The viscosity (unit: cps) of the photocurable coating composition was tested at 25° C. using a Brookfield LV viscometer.

b value: The chromaticity (b value) of the optical film was measured with a spectrophotometer (Dr. Lange Luci 100).

Cross-cut Test (adhesion): The surface of the coating layer was scratched with a cross-cut tester, bonded with an adhesive tape and peeled at 90°. The number of squares peeled was determined. The degree of adhesion was divided into six levels from 5B to 0B, 5B indicating the best adhesion, and 0B indicating the worst adhesion.

Shore hardness (25° C.): The hardness of the sample was measured at 25° C. using a Shore hardness tester from TECLOCK Company.

Shore hardness (70° C.): The hardness of the sample was measured at 70° C. using a Shore hardness tester from TECLOCK Company.

Refractive index: The refractive index of the photocurable coating composition before curing (glue) was measured at 25° C. using an Abbe refractometer of SCHMIDT HAENSCH Company.

Pencil hardness: The hardness of the coating layer was tested with a pencil for Mitsubishi standard hardness test under a load of 1 kg.

Chromatic aberration: The chromatic aberration between incident light and outgoing light of the optical film was measured by SLM-40E, AMA Optoelectronics Inc (spherical diameter 100 cm).

|  | Example | | | | | | | | Comparative Example | |
|---|---|---|---|---|---|---|---|---|---|---|
|  | 1 | 2 | 3 | 4 | 5 | 6 | 7 | 8 | 9 | 10 |
| Component (a) | 6% | 13% | 23% | 17% | 14% | 25% | 10% |  | 3% | 20% |
| Component (b) | 70% | 65% | 55% | 50% | 48% | 50% | 60% | 65% | 52% | 67% |
| Component (b1) |  |  |  |  |  |  |  |  |  |  |
| Component (c) | 21% | 19% | 19% | 30% | 35% | 20% | 25% | 19% | 40% | 10% |
| Component (d) | 3% | 3% | 3% | 3% | 3% | 5% | 5% | 3% | 5% | 3% |

-continued

| | | | | | | | | | | |
|---|---|---|---|---|---|---|---|---|---|---|
| Component (e) | | | | | | | | | | |
| Component (f) | | | | | | | | 13% | | |
| Curing speed >60 mj/cm² | ◎ | ◎ | ◎ | ◎ | ◎ | ◎ | ◎ | ○ | △ | ◎ |
| Viscosity (cps) | 438 | 660 | 505 | 185 | 122.5 | 402.5 | 260 | 360 | 81 | 1500 |
| Cross-cut test | 5B | 4B | 4B | 5B | 5B | 5B | 5B | 5B | 2B | 0B |
| Shore hardness (25° C.) | 90D | 92D | 92D | 91D | 87D | 90D | 89D | 87D | 84D | 91D |
| Shore hardness (70° C.) | 75D | 85D | 87D | 77D | 73D | 80D | 72D | 70D | 35D | 88D |
| Refractive index (gluc) | 1.5672 | 1.5622 | 1.5512 | 1.546 | 1.5438 | 1.5475 | 1.5582 | 1.561 | 1.5492 | 1.5642 |
| Pencil hardness | HB | HB | B | B | B | B | HB | B | B | B |
| b value | 0.72 | 0.7 | 0.75 | 0.78 | 0.76 | 0.68 | 0.72 | 0.71 | N/A | N/A |
| Chromatic aberration | 0.006 | 0.008 | 0.007 | 0.009 | 0.008 | 0.007 | 0.006 | 0.007 | N/A | N/A |

| | Comparative Example | | | | | | | | |
|---|---|---|---|---|---|---|---|---|---|
| | 11 | 12 | 13 | 14 | 15 | 16 | 17 | 18 | 19 |
| Component (a) | 30% | 18% | | 20% | 7% | 5% | | 6% | 25% |
| Component (b) | 38% | 35% | 60% | 50% | 75% | 47% | 65% | | 27% |
| Component (b1) | | | | | | | | 70% | |
| Component (c) | 30% | 42% | 25% | 20% | 15% | 45% | 19% | 21% | 43% |
| Component (d) | 2% | 5% | 5% | 10% | 3% | 3% | 3% | 3% | 5% |
| Component (e) | | | | 10% | | | 13% | | |
| Component (f) | | | | | | | | | |
| Curing speed >60 mj/cm² | ◎ | ◎ | △ | ◎ | ◎ | ◎ | △ | ◎ | ◎ |
| Viscosity (cps) | 192.5 | 80 | 158 | 330 | 805 | 60 | 166 | 438 | 100 |
| Cross-cut test | 3B | 5B | 2B | 0B | 0B | 3B | 2B | 5B | 5B |
| Shore hardness (25° C.) | 92D | 88D | 86D | 89D | 91D | 88D | 88D | 90D | 84D |
| Shore hardness (70° C.) | 88D | 59D | 68D | 75D | 75D | 30D | 70D | 75D | 60D |
| Refractive index (gluc) | 1.5336 | 1.5312 | 1.5552 | 1.55 | 1.5728 | 1.5435 | 1.5464 | 1.4985 | 1.5263 |
| Pencil hardness | B | B | B | B | B | B | B | B | B |
| b value | N/A | N/A | N/A | N/A | N/A | N/A | N/A | N/A | N/A |
| Chromatic aberration | N/A | N/A | N/A | N/A | N/A | N/A | N/A | N/A | N/A |

As can be seen from the results of Table 1, compared with the comparative examples, the photocurable coating composition of the present disclosure (Examples 1 to 8) can be rapidly cured and has a viscosity less than 1000 cps, and the cured coating layer has high hardness and good adhesion to the polycarbonate substrate. In addition, the photocurable coating composition of the present disclosure has a refractive index greater than 1.54 before curing, which meets the requirements of the existing market for a light guide film.

The photocurable coating composition of Comparative Example 9 did not contain a sufficient content of the component (a), and so was still insufficiently cured after being irradiated by the 60 mJ UV exposure machine with an energy ray of 60 mJ/cm and a speed of 30 m/min (i.e., it failed to be rapidly cured). The surface of a coating layer was still sticky, and therefore, some of the coating composition adhered to the structured roller and the desired corresponding structured coating layer could not be prepared. The b value and chromatic aberration of the obtained film could not be analyzed, and the Shore hardness (70° C.) was low after curing.

The photocurable coating compositions of Comparative Examples 13 and 17 used the trifunctional component (e) in place of the tetrafunctional component (a) of Examples 7 and 2, and as a result, it was found that the curing speed became lower, the Shore hardness was worse, and the adhesion between the coating layer and the polycarbonate substrate was poor (only 2B by the cross-cut test).

The photocurable coating composition of Comparative Example 10 did not contain a sufficient content of the component (c), and thus showed a higher viscosity and poor adhesion to the polycarbonate substrate (0B by the cross-cut test).

Because of the excessive content of the component (a), the photocurable coating composition of Comparative Example 11 had a higher curing speed, but the reaction rate was too high, so the adhesion between the coating layer and the substrate was poor. Moreover, the photocurable coating composition of Comparative Example 11 had a refractive index less than 1.54 before curing, which did not meet the requirements of the existing market for a light guide film.

The photocurable coating compositions of Comparative Examples 12 and 16 had a high content of the component (c), could thus reduce the viscosity to 80 cps or 60 cps, and had good adhesion to the polycarbonate substrate. However, due to the excessive content of the monofunctional monomer, the Shore hardness (70° C.) was slightly lower after curing.

The photocurable coating composition of Comparative Example 14 had an excessively high curing rate due to the excessive content of the component (d), and thus had poor adhesion to the polycarbonate substrate.

The content of the component (b) of the photocurable coating composition of Comparative Example 15 was too high, and as a result, the adhesion between the coating layer and the polycarbonate substrate was poor.

Comparative Example 18 was the same as Example 1, except that the component (b1) was used instead of the component (b). In Comparative Example 19, the component (b) was reduced to 27 wt %, and as a result, the refractive index of the obtained photocurable coating composition was less than 1.54, which did not meet the requirements of the existing market for a light guide film.

Moreover, the coating layers obtained in Comparative Examples 10 to 15 were poorly adhered to the polycarbonate substrate, or the hardness was too low to prepare a desired structured coating optical film.

From the results of the examples and comparative examples, it is apparent that the selection of each component and its amount is restricted by and affects the other components. Simply increasing the amount of a certain component does not allow the photocurable coating composition to obtain the desired characteristics. According to the present disclosure, by selection of appropriate components and amounts, a photocurable coating composition having the advantages of rapid curing and low viscosity can be formulated, thereby facilitating the preparation of an optical film having a structured surface. The obtained optical film can have the characteristics of high hardness, good adhesion, low chromatic aberration, and high refractive index at the same time, and therefore, can be used as a light guide film.

What is claimed is:

1. A photocurable coating composition, comprising:
    (a) a (meth)acrylate monomer or oligomer with at least four functional groups;
    (b) a difunctional (meth)acrylate monomer;
    (c) a monofunctional (meth)acrylate monomer; and
    (d) an initiator, wherein the difunctional (meth)acrylate monomer is present in an amount of 30 to 70 wt % based on the total weight of the photocurable coating composition, and
    wherein the monofunctional (meth)acrylate monomer has the following formula (3):

$$CH_2=C(R^{11})-C(=O)-O-L^7-Q \qquad (3)$$

wherein
    $R^{11}$ is H or methyl;
    $L^7$ is $C_{1-6}$ alkylene or $C_{1-6}$ alkoxylene; and
    Q is a phenyl group or a cyclic ether group which may be unsubstituted or substituted with a phenyl group, a phenoxy group or a $C_{1-6}$ alkylphenyl group.

2. The photocurable coating composition according to claim 1, wherein the difunctional (meth)acrylate monomer is selected from compounds of the following formula (1) or (2) or a combination thereof:

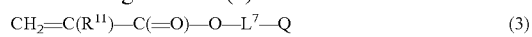

(1)

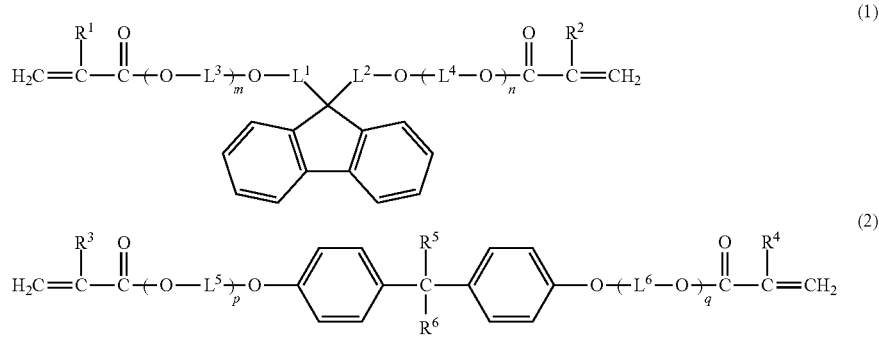

(2)

wherein $R^1$, $R^2$, $R^3$, $R^4$, $R^5$ and $R^6$ are each independently H or methyl;
$L^1$ and $L^2$ are each independently phenylene;
$L^3$, $L^4$, $L^5$ and $L^6$ are each independently $C_{1-6}$ alkylene;
m, n, p, and q are each independently 0 or an integer greater than 0;
m+n is an integer from 2 to 30; and
p+q is an integer from 2 to 30.

3. The photocurable coating composition according to claim 1, wherein the difunctional (meth)acrylate monomer comprises:

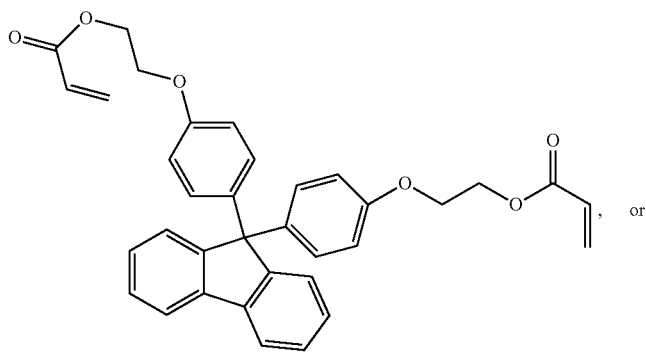

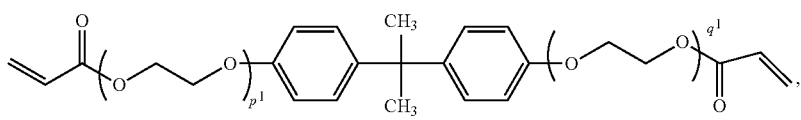

wherein $p^1$ and $q^1$ are each independently 0 or an integer greater than 0, and $p^1+q^1$ is an integer from 2 to 30.

4. The photocurable coating composition according to claim 1, wherein the composition has a viscosity of 100 to 2000 cps at 25° C.

5. The photocurable coating composition according to claim 1, wherein the (meth)acrylate monomer or oligomer with at least four functional groups is present in an amount of 5 wt % to 25 wt % based on the total weight of the photocurable coating composition.

6. The photocurable coating composition according to claim 1, wherein the (meth)acrylate monomer with at least four functional groups comprises pentaerythritol tetraacrylate, ethoxylated pentaerythritol tetraacrylate, propoxylated pentaerythritol tetraacrylate, dipentaerythritol hexaacrylate or caprolactone modified dipentaerythritol hexaacrylate.

7. The photocurable coating composition according to claim 1, wherein the (meth)acrylate oligomer with at least four functional groups comprises a hyperbranched polyurethane (meth)acrylate or a hyperbranched polyester (meth)acrylate.

8. The photocurable coating composition according to claim 1, wherein the (meth)acrylate oligomer with at least four functional groups has not more than twenty functional groups and has a number average molecular weight between 2000 and 5000.

9. The photocurable coating composition according to claim 1, wherein the monofunctional (meth)acrylate monomer is present in an amount of about 15 wt % to about 40 wt% based on the total weight of the photocurable coating composition.

10. The photocurable coating composition according to claim 1, wherein the initiator is present in an amount of about 1 wt % to about 6 wt% based on the total weight of the photocurable coating composition.

11. The photocurable coating composition according to claim 1, wherein the initiator is a hydroxyketone type photoinitiator or an acylphosphine oxide type photoinitiator.

12. An optical film, comprising a substrate and a microstructure coating layer on at least one surface of the substrate, the microstructure coating layer being formed by curing the photocurable coating composition according to claim 1.

13. The optical film according to claim 12, wherein the microstructure coating layer has a thickness of 1 to 20 μm.

14. The optical film according to claim 12, wherein the photocurable coating composition has a refractive index higher than 1.54 before curing.

15. The optical film according to claim 12, wherein the optical film has a chromatic aberration less than 0.012 between incoming light and outgoing light.

16. The optical film according to claim 12, wherein the substrate is poly carbonate.

17. The optical film according to claim 12, wherein the microstructure is a pattern of dots, an arc columnar structure, a lenticular structure, a conical structure, a microlens, or a combination thereof.

18. The optical film according to claim 12, wherein the microstructure coating layer has a pattern of dots, and the substrate has another microstructure coating layer on a surface opposite to the microstructure coating layer, the another microstructure coating layer comprising a diffusion structure selected from a group consisting of an arc columnar structure, a lenticular structure, a conical structure, a microlens, and a combination thereof.

19. The optical film according to claim 12, which is a light guide film.

20. A photocurable coating composition, comprising:
(a) a (meth)acrylate monomer or oligomer with at least four functional groups;
(b) a difunctional (meth)acrylate monomer;
(c) a monofunctional (meth)acrylate monomer; and
(d) an initiator,
wherein the difunctional (meth)acrylate monomer is present in an amount of 30 to 70 wt % based on the total weight of the photocurable coating composition, and
wherein the difunctional (meth)acrylate monomer is selected from compounds of the following formula (1) or (2) or a combination thereof:

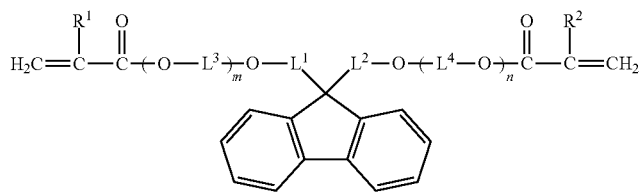

(1)

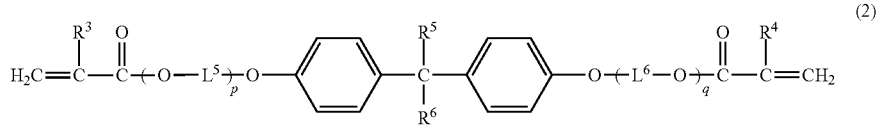

(2)

wherein $R^1$, $R^2$, $R^3$, $R^4$, $R^5$ and $R^6$ are each independently H or methyl;
$L^1$ and $L^2$ are each independently phenylene;
$L^3$, $L^4$, $L^5$ and $L^6$ are each independently C1-6 alkylene;
m, n, p, and q are each independently 0 or an integer greater than 0;
m+n is an integer from 2 to 30; and
p+q is an integer from 2 to 30.

21. A photocurable coating composition, comprising:
(a) a (meth)acrylate monomer or oligomer with at least four functional groups;
(b) a difunctional (meth)acrylate monomer;
(c) a monofunctional (meth)acrylate monomer; and
(d) an initiator,
wherein the difunctional (meth)acrylate monomer is present in an amount of 30 to 70 wt % based on the total weight of the photocurable coating composition, and
wherein the difunctional (meth)acrylate monomer comprises:

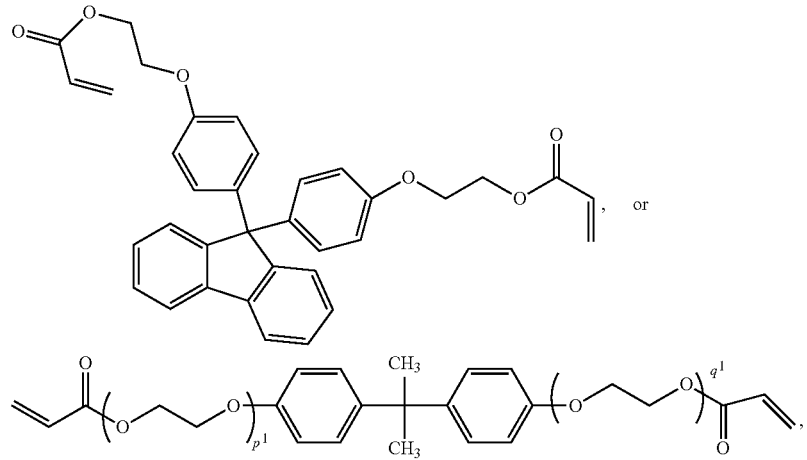

wherein $p^1$ and $q^1$ are each independently 0 or an integer greater than 0, and $p^1+q^1$ is an integer from 2 to 30.

* * * * *